(12) United States Patent
Yi (10) Patent No.: US 8,679,657 B2
(45) Date of Patent: Mar. 25, 2014

(54) BATTERY PACK

(75) Inventor: Sangil Yi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/537,922

(22) Filed: Jun. 29, 2012

(65) Prior Publication Data

US 2013/0115482 A1 May 9, 2013

(30) Foreign Application Priority Data

Nov. 3, 2011 (KR) ........................ 10-2011-0113935

(51) Int. Cl.
*H01M 14/00* (2006.01)
*H02J 7/00* (2006.01)

(52) U.S. Cl.
USPC ............................................... 429/7; 320/112

(58) Field of Classification Search
None
See application file for complete search history.

(56) References Cited

U.S. PATENT DOCUMENTS

| | | | | |
|---|---|---|---|---|
| 4,409,645 | A * | 10/1983 | Sloan | 362/200 |
| 5,437,938 | A * | 8/1995 | Mitsui et al. | 429/1 |
| 6,820,745 | B1 * | 11/2004 | Ono et al. | 206/703 |
| 7,597,996 | B2 * | 10/2009 | Ro et al. | 429/159 |
| 2005/0208346 | A1 * | 9/2005 | Moon et al. | 429/7 |
| 2008/0054849 | A1 * | 3/2008 | Kim | 320/136 |
| 2009/0072785 | A1 * | 3/2009 | Moon | 320/112 |
| 2009/0081537 | A1 * | 3/2009 | Kim | 429/176 |
| 2010/0075216 | A1 * | 3/2010 | Yoo | 429/151 |
| 2010/0266891 | A1 | 10/2010 | Kwon et al. | |
| 2010/0323226 | A1 * | 12/2010 | Kim | 429/7 |
| 2011/0129700 | A1 * | 6/2011 | Hong | 429/7 |
| 2011/0143172 | A1 | 6/2011 | Park et al. | |
| 2011/0256428 | A1 | 10/2011 | Ho et al. | |
| 2012/0028084 | A1 | 2/2012 | Park et al. | |

FOREIGN PATENT DOCUMENTS

| | | |
|---|---|---|
| KR | 2010-0081451 A | 7/2010 |
| KR | 2010-0136107 A | 12/2010 |
| KR | 2011-0059284 A | 6/2011 |

* cited by examiner

*Primary Examiner* — Patrick Ryan
*Assistant Examiner* — Jose Colucci Rios
(74) *Attorney, Agent, or Firm* — Robert E. Bushnell, Esq.

(57) ABSTRACT

A battery pack that can prevent an electrical short of a lead tab that electrically connects a battery cell and a protective circuit module. The battery pack includes a plurality of battery cells, a protective circuit module electrically connected to the battery cells, a case including a lower case in which the battery cells and the protective circuit module are mounted, and an upper case coupled to the lower case, a cell tab electrically connected to electrode terminals of the battery cells and extending to the outside of the case, a protective circuit electrically connected to the protective circuit module and extending to the outside of the case, and a connection tab formed at the outside of the case and electrically connecting the cell tab and the protective circuit tab.

16 Claims, 6 Drawing Sheets

BATTERY PACK

CLAIM OF PRIORITY

This application makes reference to, incorporated the same herein, and claims all benefits accruing under 35 U.S.C. §119 from an application for BATTERY PACK earlier filed in the Korean Intellectual Property Office on 3 Nov. 2011 and there duly assigned Serial No. 10-2011-0113935.

BACKGROUND OF THE INVENTION

1. Field of the Invention

Embodiments of the present invention relate to a battery pack.

2. Description of the Related Art

In general, a battery pack used in a portable electronic device, such as a notebook computer, a personal digital assistant (PDA) or a camcorder, is manufactured by combining multiple battery cells due to limited capacity of a battery cell.

SUMMARY OF THE INVENTION

Embodiments of the present invention provide an improved battery pack.

Embodiments of the present invention provide a battery pack which can prevent an electrical short of a lead tab that electrically connects a battery cell and a protective circuit module.

According to one aspect of the present invention, a battery pack is provided. The battery pack includes a plurality of battery cells, a protective circuit module electrically connected to the battery cells, a case including a lower case in which the battery cells and the protective circuit module are mounted, and an upper case coupled to the lower case, a cell tab electrically connected to electrode terminals of the battery cells and extending to the outside of the case, a protective circuit tab electrically connected to the protective circuit module and extending to the outside of the case, and a connection tab formed at the outside of the case and electrically connecting the cell tab and the protective circuit tab.

The cell tab may include protrusions exposed to the outside of the case.

The cell tab may include a positive electrode cell tab electrically connected to at least one positive electrode terminal of the battery cells, and a negative electrode cell tab electrically connected to at least one negative electrode terminal of the battery cells. The positive electrode cell tab may be exposed to the outside of the upper case through a hole formed in the upper case and the negative electrode cell tab may be exposed to the outside of the lower case through a hole formed in the lower case.

The protective circuit tab may include coupling parts coupled to the protective circuit module, extending parts extending from the coupling part and formed between the battery cells and the case, and protruding parts extending from the extending parts and exposed to the outside of the case while passing through the case.

At least one of the extending parts may be upwardly convexly formed while surrounding the battery cells, and at least one of the protruding parts may be exposed to the outside of the upper case through a hole formed in the upper case.

At least one of the extending parts may be downwardly convexly formed while surrounding the battery cells, and at least one of the protruding parts may be exposed to the outside of the lower case through a hole formed in the lower case.

The protective circuit module may include through holes formed at one side thereof, and the coupling parts may be coupled to the through holes.

The protective circuit tab may be insert-injected into the inside of the case.

The connection tab may be insert-injected into the outside of the case.

The cell tab may include protrusions exposed to the outside of the case. The protective circuit tab may include protruding parts exposed to the outside of the case. The connection tab may electrically:connect the protrusions and the protruding parts.

The battery pack may further include a finishing member adhered to the case to cover the connection tab.

The finishing member may include an upper finishing member adhered to the uppercase, and a lower finishing member adhered to the lower case.

According to another aspect of the present invention, there is provided a lead tab that electrically connects a plurality of battery cells and a protective circuit module accommodated within a case. The lead tab includes a cell tab electrically connected to electrode terminals of the battery cells and extending to the outside of the case, a protective circuit tab electrically connected to the protective circuit module and extending to the outside of the case, and a connection tab formed at the outside of the case and electrically connecting the cell tab and the protective circuit tab.

The cell tab may include protrusions exposed to the outside of the case.

The cell tab may include a positive electrode cell tab electrically connected to at least one of positive electrode terminals of the battery cells, and a negative electrode cell tab electrically connected to at least one of negative electrode terminals of the battery cells. The positive electrode cell tab may be exposed to the outside of the upper case through a hole formed in the upper case and the negative electrode cell tab may be exposed to the outside of the lower case through a hole formed in the lower case.

The protective circuit tab may include coupling parts coupled to the protective circuit module, extending parts extending from the coupling part and formed between the battery cells and the case, and protruding parts extending from the extending parts and exposed to the outside of the case while passing through the case.

The protective circuit module may include through holes formed at one side thereof, and the coupling parts may be coupled to the through holes.

The protective circuit tab may be insert-injected into the inside of the case.

The connection tab may be insert-injected into the outside of the case.

The cell tab may include protrusions exposed to the outside of the case, the protective circuit tab may include protruding parts exposed to the outside of the case, and the connection tab may electrically connect the protrusions and the protruding parts.

In the battery pack constructed as an embodiment according to the principles of the present invention, since a first connection tab connected to at least one of the positive electrode terminals of the battery cells is positioned above the case and a third connection tab connected to at least one of the negative electrode terminals of the battery cells is positioned under the case, internal short-circuits of the battery cells can be prevented.

In addition, in the battery pack constructed as an embodiment according to the principles of the present invention, since a connection tab connecting the cell tab electrically connected to the battery cells and a protective circuit tab electrically connected to the protective circuit module is formed outside the case, internal short-circuits of the battery cells can be prevented.

In addition, in the battery pack constructed as an embodiment according to the principles of the present invention, since the protective circuit tab electrically connected to the protective circuit module is insert-injected into the inside of the case, the manufacturing process can be simplified and the manufacturing cost can be reduced.

Further, in the battery pack constructed as an embodiment according to the principles of the present invention, since the connection tab electrically connecting; the cell tab and the protective circuit tab is insert-injected into the outside of the case, the manufacturing process can be simplified and the manufacturing cost can be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A battery pack includes a lower case, a plurality of battery cells accommodated in the lower case, a protective circuit module electrically connected to the battery cells and controlling charged/discharged states of the battery cells, and an upper case coupled to the lower case and protecting the battery cells and the protective circuit module from external surroundings. The battery cells are vulnerable to disruption due to over-charge or over-discharge. In addition, charged and discharged states of individual battery cells are different from each other. Therefore, the protective circuit module controls charging and discharging of all battery cells to make the battery cells uniformly charged. The protective circuit module is electrically connected to the battery cells by a tab made of nickel or a conductive wire. Here, since the tab or conductive wire is formed inside the case and is connected to positive and negative electrodes of the battery cells, tabs of different polarities are vulnerable to an electrical short.

Hereinafter, embodiments of embodiments of the invention will be described in detail with reference to the accompanying drawings such that they can easily be made and used by those skilled in the art.

Figure 1:
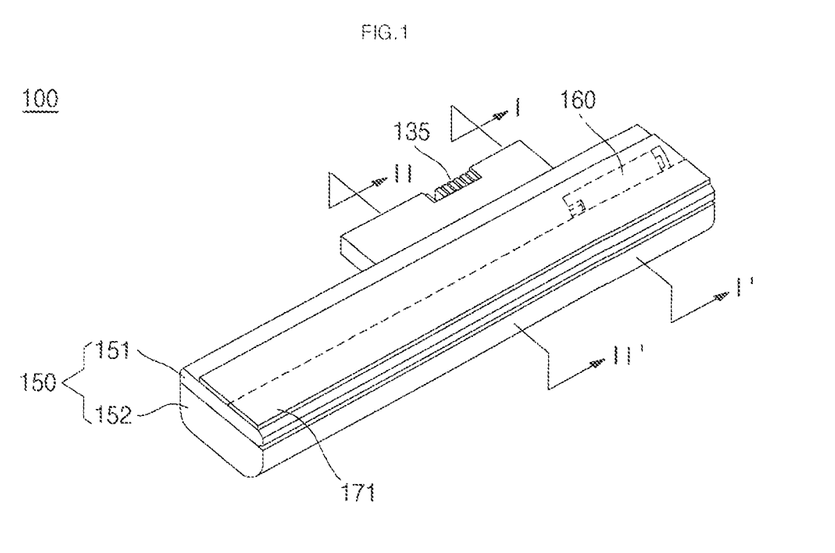
FIG. 1 is an oblique view of a battery pack constructed as an embodiment according to the principles of the present invention.
Figure 2:
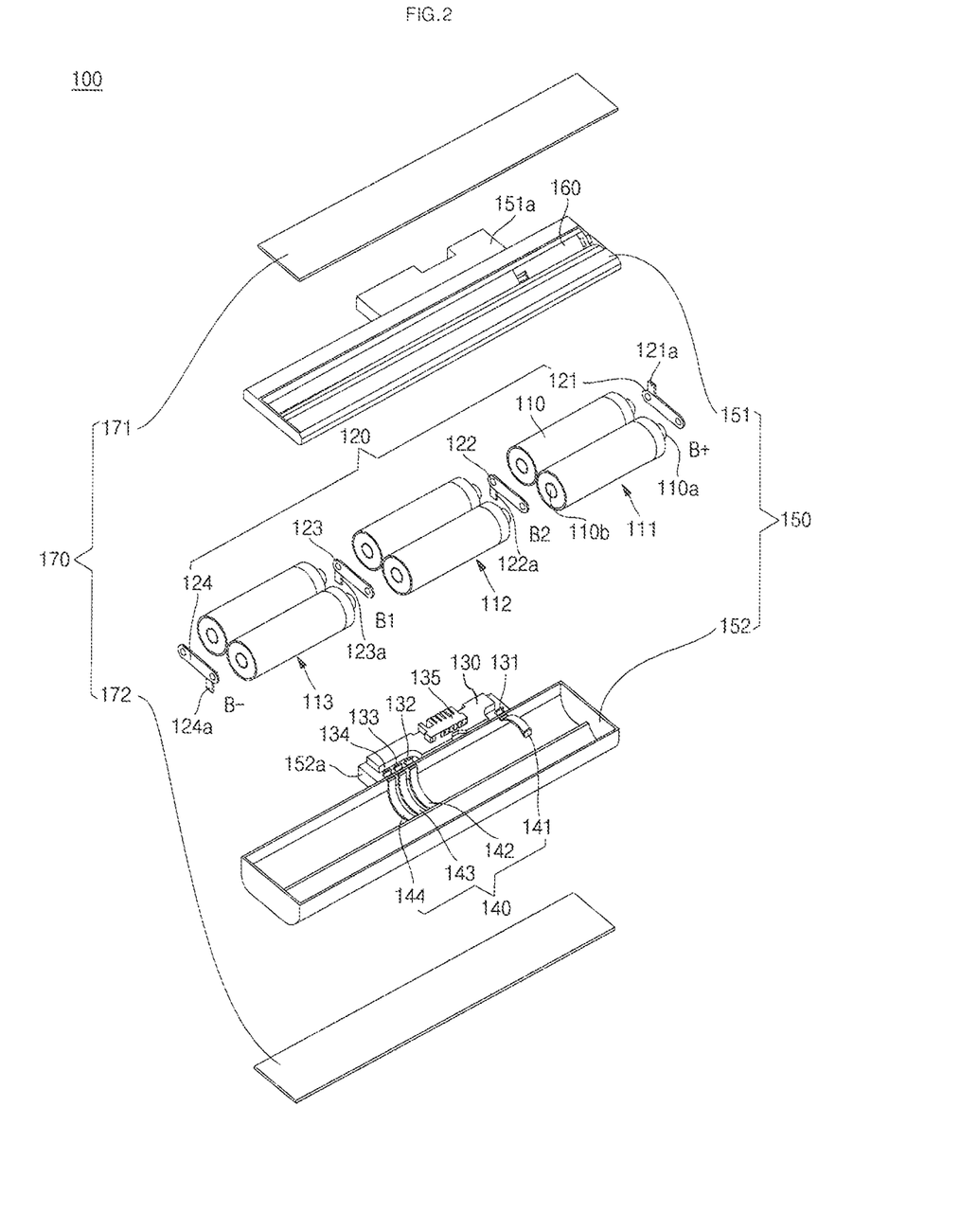
FIG. 2 is an exploded oblique view of the battery pack shown in FIG. 1.
Figure 3:
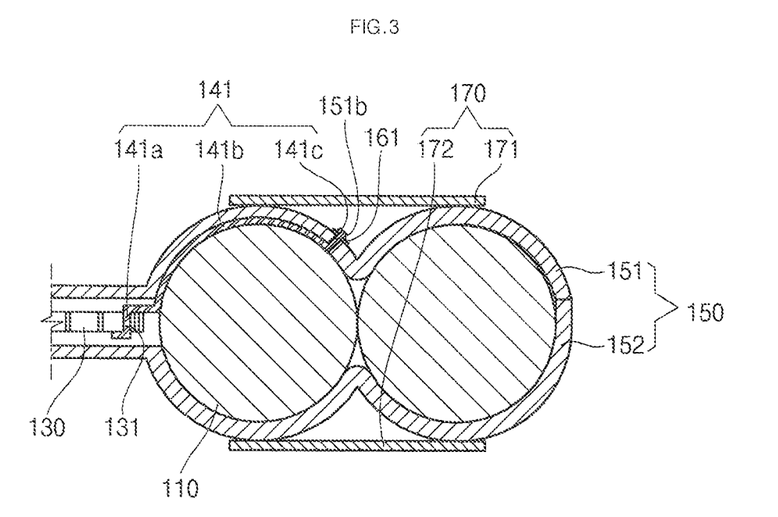
FIG. 3 is a sectional view of the battery pack, taken along line of FIG. 1.
Figure 4:
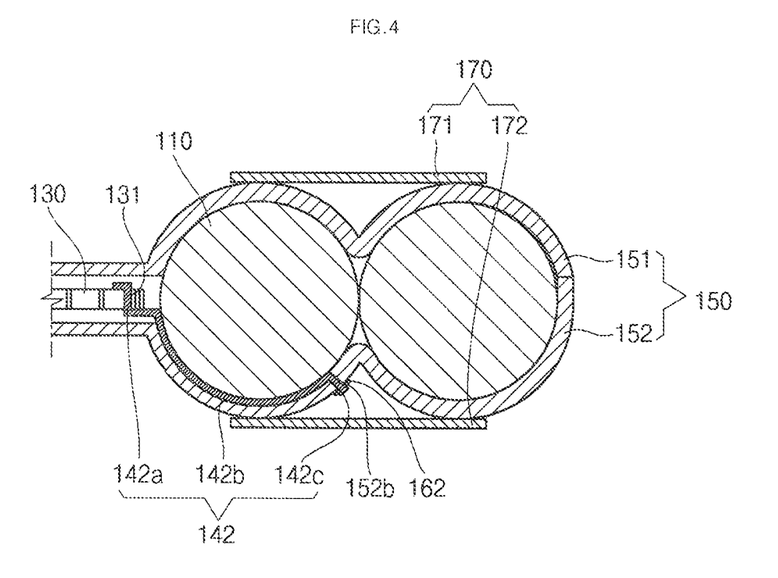
FIG. 4 is a sectional view of the battery pack, taken along line II-II' of FIG. 1.
Figure 5A:
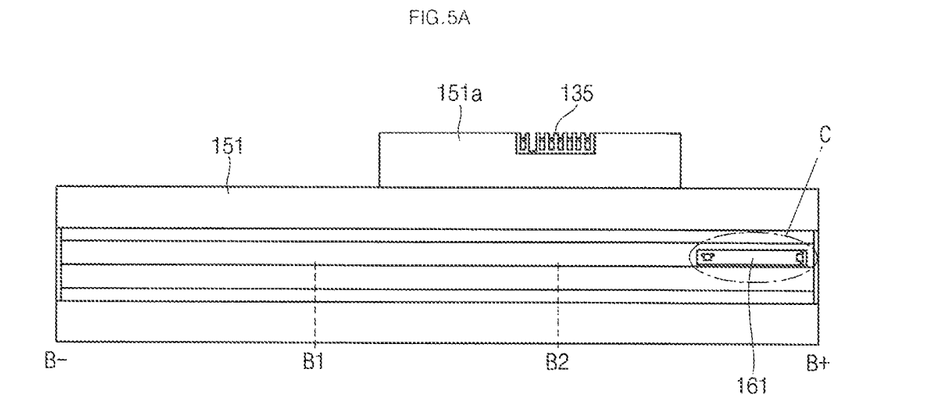
FIG. 5A is a plan view of the battery pack shown in FIG. 1.
Figure 5B:
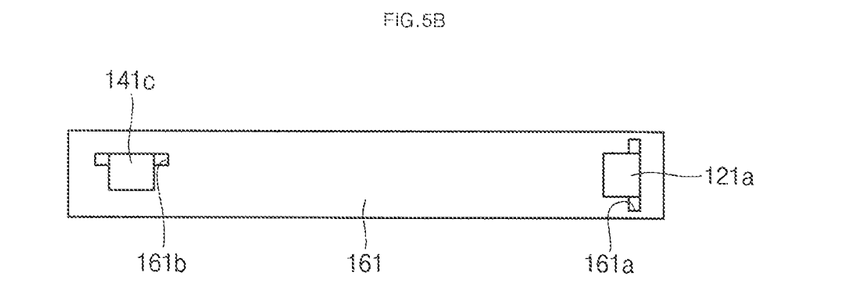
FIG. 5B is an enlarged view of portion 'C' shown in FIG. 5A.
Figure 6:
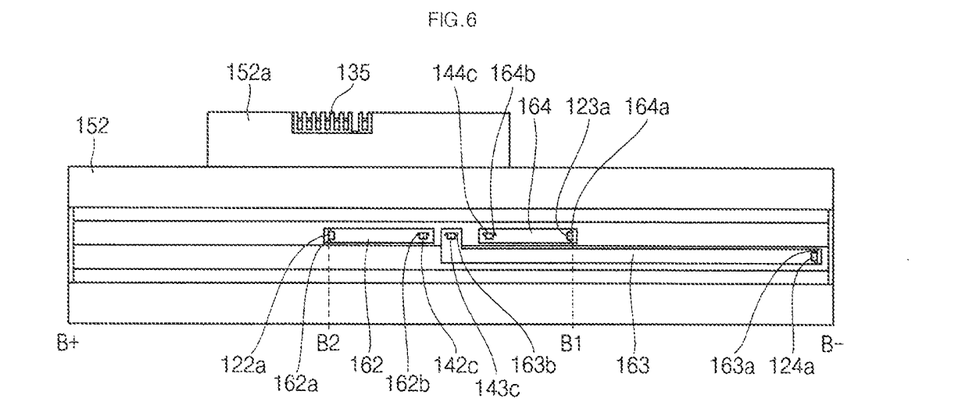
FIG. 6 is a bottom view of the battery pack shown in FIG. 1.
Figure 7:
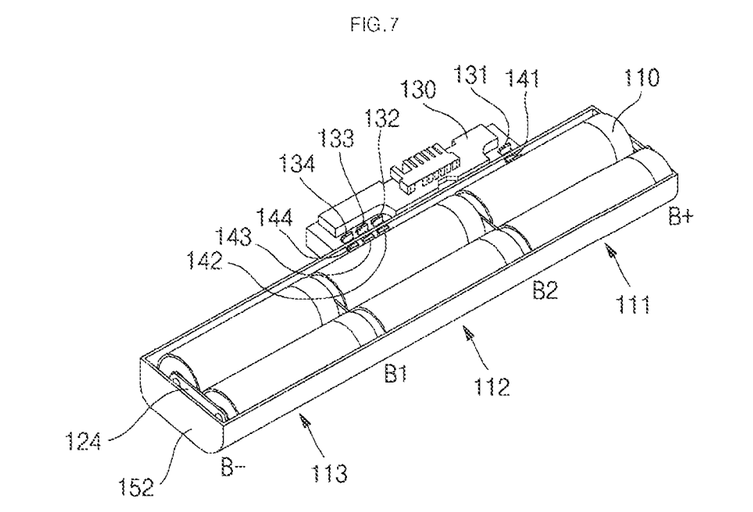
FIG. 7 is an oblique view illustrating that battery cells and the protective circuit module shown in FIG. 2 are placed in a lower case.
Figure 8:
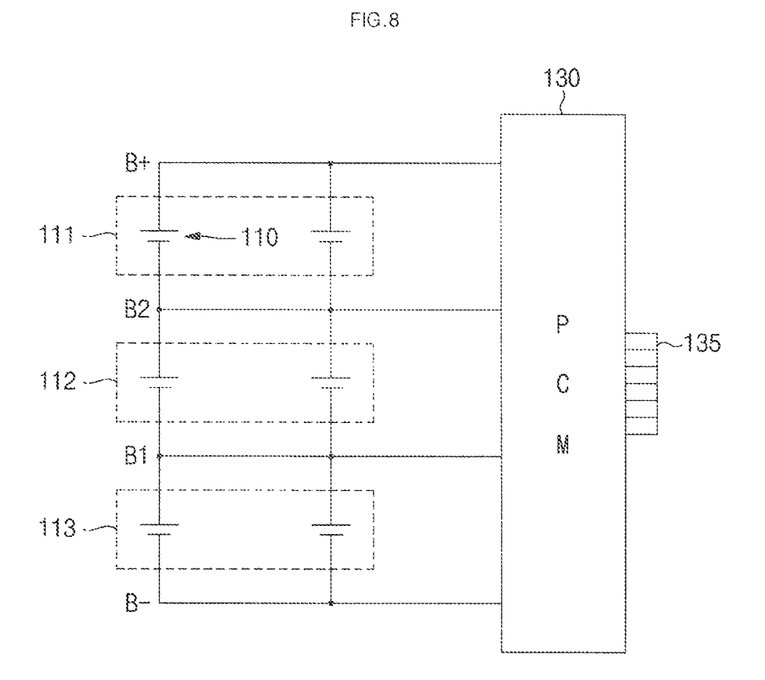
FIG. 8 is a circuit diagram of the battery pack shown in FIG. 1.
Figure 9:
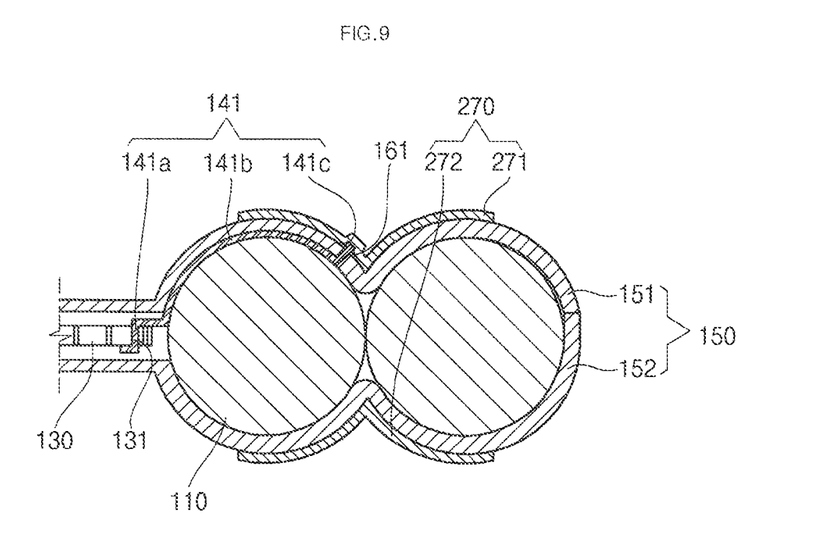
FIG. 9 is a cross-sectional view illustrating another example of a finishing member shown in FIG. 3 or 4, as an embodiment according to the principles of the present invention.

FIG. 1 is an oblique view of a battery pack constructed as an embodiment according to the principles of the present invention. FIG. 2 is an exploded oblique view of the battery pack shown in FIG. 1. FIG. 3 is a sectional view of the battery pack, taken along the line I-I' of FIG. 1. FIG. 4 is a sectional view of the battery pack, taken along, the line II-II' of FIG. 1. FIG. 5A is a plan view of the battery pack shown in FIG. 1. FIG. 5B is an enlarged view of portion 'C' shown in FIG. 5A. FIG. 6 is a bottom view of the battery pack shown in FIG. 1. FIG. 7 is an oblique view illustrating that battery cells and the protective circuit module shown in FIG. 2 are placed in a lowercase. FIG. 8 is a circuit diagram of the battery pack shown in FIG. 1. FIG. 9 is a cross-sectional view illustrating another example of a finishing member shown in FIG. 3 or 4, as an embodiment according to the principles of the present invention.

Referring to FIGS. 1 to 8, the battery pack 100 constructed as an embodiment according to the principles of the present invention includes a plurality of battery cells 110, a cell tab 120, a protective circuit module (PCM) 130, a protective circuit tab 140, a case 150 consisting of an upper case 151 and a lower case 152, a connection tab 160 and a finishing member 170. Here, the cell tab 120, the protective circuit tab 140 and the connection tab 160 may be defined as lead tabs, and the lead tabs may serve to electrically connect the battery cells 110 and the protective circuit module 130.

The plurality of battery cells 110 are designed such that top and bottom surfaces thereof have different polarities. In the drawings, the top surfaces of the battery cells 110 having convexly formed terminal shapes denote positive electrode terminals 110a and the bottom surfaces of the battery cells 110 having planar shapes denote negative electrode terminals 110b. Here, it is assumed that in each one of the battery cells 110, the top surface is electrically connected to a positive electrode of an electrode assembly (not shown) in the battery cell, and the bottom surface is electrically connected to a negative electrode of the electrode assembly in the to battery cell. The battery cells 110 may be cylindrical rechargeable batteries. While six of the plurality of battery cells 110 are shown in the illustrated embodiment, the invention does not limit the number of the plurality of battery cells 110. According to present invention, as shown in FIG. 8, the battery pack 100 is formed by three battery cell sets each having two of the plurality of battery cells 110 connected in parallel, and the three battery cell sets are connected in series to each other. Therefore, the plurality of battery cells 110 are formed by a first battery cell set 111, a second battery cell set 112 and a third battery cell set 113, which is referred to as a 3 series-2 parallel structure. The plurality of battery cells 110 is placed within the case 150, and the cell tab 120 is electrically connected to electrode terminals of each of the battery cell sets 111, 112 and 113. Each battery cell set includes a positive electrode terminal which has the same electrical potential as the two positive electrode terminals of the two battery cells constituting the battery cell set, and a negative electrode terminal which has the same electrical potential as the two negative electrode terminals of the two battery cells.

In the drawings, B+ and B− denote high current terminals, which are power supply units of opposite ones among the battery cells 110 connected in series/parallel. Specifically, B+ denotes a positive electrode power supply unit, that is, the highest potential terminal, and B− denotes a negative electrode power supply unit, that is, the lowest potential terminal. Therefore, a positive electrode terminal of the first battery cell set 111 may be a highest power terminal B+, and a negative electrode terminal of the third battery cell set 113 may be a lowest power terminal B−. In addition, B1 and B2 denote sensing terminals, which are portions of the battery cells 110 having different polarities, connected in series. The sensing terminals B1 and B2 denote intermediate potential terminals between the highest potential terminal B+ and the lowest potential terminal B−. That is to say, B1 may correspond to a contact portion between the positive electrode terminal of the third battery cell set 113 and the negative electrode terminal of the second battery cell set 112, and B2 may correspond to a contact portion between the positive electrode terminal of the second battery cell set 112 and the negative electrode terminal of the first battery cell set 111.

The cell tab 120 serves to electrically connect the battery cell sets 111, 112 and 113 to each other in parallel. In addition, the cell tab 120 is sized and shaped to make electrode terminals of two battery cells constituting a battery cell set connected to each other in parallel. In addition, the cell tab 120 may be made of a highly electrically conductive metal, such as copper, nickel, aluminum, etc. The cell tab 120 includes a first cell tab 121, a second cell tab 122, a third cell tab 123 and a fourth cell tab 124. The cell tabs 121, 122, 123 and 124 have protrusions 121a, 122a, 123a and 124a, respectively, and the protrusions 121a, 122a, 123a and 124a are exposed to the outside of the case 150.

The first cell tab 121 is welded and electrically connected to the positive electrode terminal of the first battery cell set 111. In addition, the first cell tab 121 has a first protrusion 121a that protrudes upwardly, and the first protrusion 121a is exposed to the outside of the case 150 through a hole (not shown) formed in the upper case 151. Since the first cell tab 121 is electrically connected to the highest power terminal B+ of the battery cells 110, it may be defined as a positive electrode cell tab.

The second cell tab 122 is welded and electrically connected between the negative electrode terminal of the first battery cell set 111 and the positive electrode terminal of the second battery cell set 112. In addition, the second cell tab 122 has a second protrusion 122a that protrudes downwardly, and the second protrusion 122a is exposed to the outside of the case 150 through a hole (not shown) formed in the lower case 152.

The third cell tab 123 may be welded and electrically connected between the negative electrode terminal of the second battery cell set 112 and the positive electrode terminal of the third battery cell set 113. In addition, the third, cell tab 123 has a third protrusion 123a that protrudes downwardly, and the third protrusion 123a is exposed to the outside of the case 150 through a hole (not shown) formed in the lower case 152.

The fourth cell tab 124 is welded and electrically connected to the negative electrode terminal of the third battery cell set 113. In addition, the fourth cell tab 124 has a fourth protrusion 124a that protrudes downwardly, and the fourth protrusion 124a is exposed to the outside of the case 150 through a hole (not shown) formed in the lower case 152. Since the fourth cell tab 124 is electrically connected to the lowest power terminal B− of the battery cells 110, it may be defined as a negative electrode cell tab.

That is to say, the first cell tab 121 is exposed to the outside of the upper case 151, and the second cell tab 122, the third cell tab 123 and the fourth cell tab 124 are exposed to the outside of the lower case 152. The cell tab 120 may be insert-injected into the case 150 or may be welded to the battery cells 110 in advance and then may be fitted into the case 150.

As described above, in the battery pack 100 constructed as the embodiment of the present invention, the first cell tab 121 electrically connected to the highest potential terminal of the battery cells 110 is upwardly exposed from the case 150, and the fourth cell tab 124 electrically connected to the lowest potential terminal B− of the battery cells 110 is downwardly exposed from the case 150, an electrical short between positive and negative electrode terminals of the battery cells 110 can be prevented by separating the positive and negative electrode terminals of the battery cells 110 from each other upwardly and downwardly.

The PCM 130 is mounted within the lower case 152 and may be formed of a printed circuit board (PCB) having a substantially rectangular shape. The PCM 130 is positioned at one side of the battery cells 110 in a direction perpendicular to a direction in which the battery cells 110 are connected to each other in series. The PCM 130 is electrically connected to the battery cells 110 and checks information regarding charged/discharged states, current, voltage or temperature of the battery cells 110 to protect the battery pack 100. In addition, through holes 131, 132, 133 and 134 are formed at one side of the PCM 130. Here, the through holes 131, 132, 133 and 134 are formed at a side of the PCM 130, which is adjacent to the battery cells 110. The through holes 131, 132, 133 and 134 include a first through hole 131, a second through hole 132, a third through hole 133 and a fourth through hole 134. The protective circuit tab 140, passing through the through holes 131, 132, 133 and 134, is electrically connected to the through holes 131, 132, 133 and 134. The first through hole 131 is formed at one end of the PCM 130, and the second through hole 132, the third through hole 133 and the fourth through hole 134 are formed at the other end of the PCM 130. The PCM 130 may also includes a connector 135 formed at the other side, the connector 135 having a substantially rectangular parallelepiped shape. The connector 135 electrically connects an external electronic device (not shown) and the PCM 130. In order to promote an electrical connection with the external electronic device, the connector 135 is formed at a side of the PCM 130 opposite to the side at which the through holes 131, 132, 133 and 134 are formed. That is to say, the connector 135 is positioned opposite to the battery cells 110 formed at one side of the PCM 130, thereby facilitating the electrical connection with the external electronic device.

One side of the protective circuit tab 140 is electrically connected to the PCM 130 and the other side thereof is exposed to the outside of the case 150. That is to say, the protective circuit tab 140 includes coupling parts 141a and 142a coupled to the. PCM 130, extending parts 141b and 142b extending from the coupling parts 141a and 142a, and surrounding the battery cells 110, and protruding parts 141c, 142c, 143c and 144c exposed to the outside of the case 150. In addition, the protective circuit tab 140 may be made of a highly electrically conductive metal, such as copper, nickel, aluminum, etc. The protective circuit tab 140 may be insert-injected into the case 150 or coupled to the PCM 130 and then be fitted into the case 150. The protective circuit tab 140 includes a first protective circuit tab 141, a second protective circuit tab 142, a third protective circuit tab 143 and fourth protective circuit tab 144.

The first protective circuit tab 141 includes a first coupling parts 141a, a first extending part 141b and a first protruding part 141c. The first coupling part 141a is engaged with the first through hole 131 formed in the PCM 130. Here, the first coupling part 141a may be fixed to the first through hole 131 by soldering to then be electrically connected to the PCM 130. The first extending part 141b extends from the first coupling part 141a and surrounds upper portions of the battery cells 110. That is to say, the first extending part 141b is formed between the battery cell 110 and the upper case 151 and is upwardly convexly formed to surround one of the battery cells 110 of the first battery cell set 111. The first protruding part 141c passes through the upper case 151 and is exposed to the outside of the upper case 151 through a hole 151b formed in the upper case 151. The first protective circuit tab 141 may be electrically connected to the first cell tab 121 through a connection tab 160 to be described later. Therefore, the first protective circuit tab 141 may be electrically connected to a positive electrode terminal, which is the highest potential terminal B+ of the battery cells 110.

The second protective circuit tab 142 includes a second coupling part 142a, a second extending part 142b and a second protruding part 142c. The second coupling part 142a is engaged with the second through hole 132 formed in the PCM 130. Here, the second coupling part 142a may be fixed to the second through hole 132 by soldering to then be electrically connected to the PCM 130. The second extending part 142b extends from the second coupling part 142a and surrounds lower portions of the battery cells 110. That is to say, the second extending part 142b is formed between the battery cell 110 and the lower case 152 and is downwardly convexly formed to surround one of the battery cells 110 of the second battery cell set 112. The second protruding part 142c passes through the lower case 152 and is exposed to the outside of the lower case 152 through a hole 152b formed in the lower case 152. The second protective circuit tab 142 may be electrically connected to the second cell tab 122 through the connection tab 160. Therefore, the second protective circuit, tab 142 may be electrically connected to a sensing terminal B2 of the battery cells 110.

Since the third protective circuit tab 143 and the fourth protective circuit tab 144 have the same configuration as the second protective circuit tab 142, a detailed description thereof will not be given. However, the third protective circuit tab 143 is electrically connected to the fourth cell tab 124 through the connection tab 160 to then be electrically connected to the negative electrode terminal, which is the lowest potential terminal B− of the battery cells 110. The fourth protective circuit tab 144 is electrically connected to the third cell tab 123 through the connection tab 160 to then be electrically connected to a sensing terminal B1 of the battery cells 110.

The case 150 accommodates the plurality of battery cells 110 and the PCM 130. The case 150 includes the lower case 152 in which the plurality of battery cells 110 and the PCM 130 are mounted, and the upper case 151 covering the lower case 152. The case 150 may be made of an insulating material, for example, a plastic material.

The lower case 152 is shaped of a box having a top opening to accommodate the battery cells 110, and further includes a protruding part 152a formed at its one side to accommodate the PCM 130. The protruding part 152a is sized to correspond to the PCM 130 and has a hole located at a position corresponding to the connector 135 of the PCM 130 to allow the connector 135 to be exposed to the outside. In addition, holes through which the cell tab 120 and the protective circuit tab 140 pass are formed in the lower case 152. Therefore, the second cell tab 122, the third cell tab 123, the fourth cell tab 124, the second protective circuit tab 142, the third protective circuit tab 143 and the fourth protective circuit tab 144 may be exposed to the outside of the lower case 152 through the hole formed in the lower case 152.

The upper case 151 is sized to correspond to a top, end of the lower case 152 and is coupled to the top end of the lower case 152, constituting the case 150, which forms an external appearance of the battery pack 100. Here, the upper case 151 may be adhered to the lower case 152 using an adhesive or in an interference fit manner. In addition, the upper case 151 has a protruding part 151a sized to correspond to the PCM 130. In addition, holes through which the cell tab 120 and the protective circuit tab 140 pass are formed in the upper case 151. Therefore, the first cell tab 121 and the first protective circuit tab 141 may be exposed to the outside of the upper case 151 through the hole formed in the upper case 151.

The connection tab 160 may serve to electrically connect the cell tab 120 and the protective circuit tab 140 from the outside of the case 150. In addition, the connection tab 160 may be made of a highly electrically conductive metal, such as copper, nickel, aluminum, etc. The connection tab 140 may be insert-injected into the case 150 or the cell tab 120 and the protective circuit tab 140 may be coupled to the case 150, and may then be fitted into the case 150.

The connection tab 160 includes a first connection tab 161, a second connection tab 162, a third connection tab 163 and a fourth connection tab 164.

The first connection tab 161 electrically connects the first cell tab 121 and the first protective circuit tab 141 on a surface of the upper case 151. The first connection tab 161 is formed to have a substantially straight (—) shape. In addition, a hole is formed in the first connection tab 161 at the same location as the hole formed in the upper case 151. Referring to FIGS. 5A and 5B, a cell hole 161a through which the first cell tab 121 passes and a protective circuit hole 161b through which the first protective circuit tab 141 passes may be formed in the first connection tab 161. In addition, the cell hole 161a and the protective circuit hole 161b are formed in substantially rectangular shapes. The protective circuit hole 161b is formed in parallel with a direction in which the battery cells 110 are connected in series to each other, and the cell hole 161a is formed in a direction perpendicular to the protective circuit hole 161b. That is to say, the first protrusion 121a of the first cell tab 121 and the first protruding part 141c of the first protective circuit tab 141 may protrude to the outside of the case 150 through the first connection tab 161. Here, since the first protrusion 121a and the first protruding part 141c are fixed to the first connection tab 161 by soldering or welding, the first cell tab 121 and the first protective circuit tab 141 may be electrically connected to the first connection tab 161. Therefore, like the first cell tab 121, the first connection tab 161 is electrically connected to the positive electrode terminal, which is the highest potential terminal B+ of the battery cells 110.

The second connection tab 162 electrically connects the second cell tab 122 and the second protective circuit tab 142 on a surface of the lower case 152. The second connection tab 162 is formed to have a substantially straight (—) shape. In addition, a hole is formed in the second connection tab 162 at the same location as the hole formed in the lower case 152. Referring to FIG. 6, a cell hole 162a through which the second cell tab 122 passes and a protective circuit hole 162b through which the second protective circuit tab 142 passes may be formed in the second connection tab 162. In addition, the cell hole 162a and the protective circuit hole 162b are formed in substantially rectangular shapes. The protective circuit hole 162b is formed in parallel with a direction in which the battery cells 110 are connected in series to each other, and the cell hole 162a is formed in a direction perpendicular to the protective circuit hole 162b. That is to say, the second protrusion 122a of the second cell tab 122 and the second protruding part 142c of the second protective circuit tab 142 may protrude to the outside of the second connection tab 162. Here, since the second protrusion 122a and the second protruding part 142c are fixed to the second connection tab 162 by soldering or welding, the second cell tab 122 and the second protective circuit tab 142 may be electrically connected to the second connection tab 162. Therefore, like the second cell tab 122, the second connection tab 162 is electrically connected to the sensing terminal B2 of the battery cells 110.

The third connection tab 163 electrically connects the fourth cell tab 124 and the third protective circuit tab 143 on the surface of the lower case 152. The third connection tab 163 is substantially L-shaped. In addition, a hole is formed in the third connection tab 163 at the same location as the hole formed in the lower case 152. A cell hole 163a through which the fourth cell tab 124 passes and a protective:circuit hole 163b through which the third protective circuit tab 143 passes may be formed in the third connection tab 163. Therefore, the fourth protrusion 124a of the fourth cell tab 124 and the third protruding part 143c of the third protective circuit tab 143 may protrude to the outside of the third connection tab 163. Here, since the fourth protrusion 124a and the third protruding part 143c are fixed to the third connection tab 163 by soldering or welding, the fourth cell tab 124 and the third protective circuit tab 143 may be electrically connected to the third connection tab 163. Therefore, like the fourth cell tab 124, the third connection tab 163 is electrically connected to the negative electrode terminal B−, which is the lowest potential terminal of the battery cells 110.

The fourth connection tab 164 electrically connects the third cell tab 123 and the fourth protective circuit tab 144 on the surface of the lower case 152. The fourth connection tab 144 is formed to have a substantially straight (—) shape. In addition, a hole is formed in the fourth connection tab 144 at the same location as the hole formed in the lower case 152. A cell hole 164a through which the third cell tab 123 passes and a protective circuit hole 164b through which the fourth protective circuit tab 144 passes may be formed in the fourth connection tab 164. Therefore, the third protrusion 123a of the third cell tab 123 and the fourth protruding part 144c of the fourth protective circuit tab 144 may protrude to the outside of the fourth connection tab 164. Here, since the third protrusion 123a and the fourth protruding part 144c are fixed to the fourth connection tab 164 by soldering or welding, the third cell tab 123 and the fourth protective circuit tab 144 may be electrically connected to the fourth connection tab 164. Therefore, like the third cell tab 123, the fourth connection tab 164 is electrically connected to the sensing terminal B1 of the battery cells 110.

The finishing member 170 includes an upper finishing member 171 adhered to the upper case 151 and a lower finishing member 172 adhered to the lower case 152. The finishing member 170 is adhered to the case 150 to cover the connection tab 160. In addition, the finishing member 170 is formed of an insulating tape to prevent an electric short between the connection tab 160 and, an external device.

The upper finishing member 171 is adhered to the upper case 151 to cover the first connection tab 161. In addition, the lower finishing member 172 is adhered to the lower case 152 to cover the second connection tab 162, the third connection tab 163 and the fourth connection tab 164. Referring to FIGS. 3 and 4, the finishing member 170 may be flatly adhered to the case 150. In addition, as shown in FIG. 9, the finishing member 270 may be closely adhered to the upper case 151 and the lower case 152 to follow the contours of the case 150.

As described above, in the battery pack constructed as the embodiment according to the principles of the present invention, since the first connection tab connected to the positive electrode terminals of the battery cells is positioned above the case and the third connection tab connected to the negative electrode terminals of the battery cells is positioned below the case, internal short circuits of the battery cells can be prevented.

In addition, in the battery pack constructed as the embodiment according to the principles of the present invention, since a connection tab connecting the cell tab electrically connected to the battery cells and a protective circuit tab electrically connected to the protective circuit module is formed outside the case, internal short-circuits of the battery cells can be prevented.

In addition, in the battery pack constructed as an embodiment according to the principles of the present invention, since the protective circuit tab electrically connected to the protective circuit module is insert-injected into the inside of the case, the manufacturing process can be simplified and the manufacturing cost can be reduced.

Further, in the battery pack constructed as an embodiment according to the principles of the present invention, since the connection tab electrically connecting the cell tab and the protective circuit tab is insert-injected into the outside of the case, the manufacturing process can be simplified and the manufacturing cost can be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:
a plurality of battery cells;
a protective circuit module electrically connected to the battery cells;
a case including a lower case in which the battery cells and the protective circuit module are mounted, and an upper case coupled to the lower case;
a cell tab electrically connected to electrode terminals of the battery cells and extending to an outside of the case;
a protective circuit tab electrically connected to the protective circuit module and extending to the outside of the case; and
a connection tab formed solely and entirely at the outside of the case and electrically connecting the cell tab and the protective circuit tab,
wherein the cell tab includes protrusions exposed to the outside of the case, the protective circuit tab includes coupling parts connected to the protection circuit module, extending parts wrapping around an in direct contact with a portion of the battery cell and connected to the coupling parts, protruding parts connected to the extending parts exposed to the outside of the case, and the connection tab electrically connects the protrusions and the protruding parts.

2. The battery pack of claim 1, wherein the cell tab includes a positive electrode cell tab electrically connected to at least one positive electrode terminal of the battery cells, and a negative electrode cell tab electrically connected to at least one negative electrode terminal of the battery cells, the positive electrode cell tab is exposed to the outside of the upper case through a hole formed in the upper case and the negative electrode cell tab is exposed to the outside of the lower case through a hole formed in the lower case.

3. The battery pack of claim 1, wherein the protective circuit tab comprises:
   coupling parts coupled to the protective circuit module;
   extending parts extending from the coupling part and formed between the battery cells and the case; and
   protruding parts extending from the extending parts and exposed to the outside of the case while passing through the case.

4. The battery pack of claim 3, wherein at least one of the extending parts is upwardly convexly formed while surrounding the battery cells, and at least one of the protruding parts is exposed to the outside of the upper case through a hole formed in the upper case.

5. The battery pack of claim 3, wherein at least one of the extending parts is downwardly convexly formed while surrounding the battery cells, and at least one of the protruding parts is exposed to the outside of the lower case through a hole formed in the lower case.

6. The battery pack of claim 3, wherein the protective circuit module includes through holes formed at one side thereof, and the coupling parts are coupled to the through holes.

7. The battery pack of claim 1, wherein the protective circuit tab is insert-injected into the inside of the case.

8. The battery pack of claim 1, wherein the connection tab is insert-injected into the outside of the case.

9. The battery pack of claim 1, further comprising a finishing member adhered to the case to cover the connection tab.

10. The battery pack of claim 9, wherein the finishing member includes an upper finishing member adhered to the upper case, and a lower finishing member adhered to the lower case.

11. A lead tab that electrically connects a plurality of battery cells and a protective circuit module accommodated within a case, the lead tab comprising:
    a cell tab electrically connected to electrode terminals of the battery cells and extending to the outside of the case;
    a protective circuit tab electrically connected to the protective circuit module and extending to the outside of the case; and
    a connection tab formed solely and entirely at the outside of the case and electrically connecting the cell tab and the protective circuit tab,
    wherein the cell tab includes protrusions exposed to the outside of the case, the protective circuit tab includes coupling parts connected to the protection circuit module, extending parts wrapping around an in direct contact with a portion of the battery cell and connected to the coupling parts, protruding parts connected to the extending parts exposed to the outside of the case, and the connection tab electrically connects the protrusions and the protruding parts.

12. The lead tab of claim 11, wherein the cell tab includes a positive electrode cell tab electrically connected to at least one of positive electrode terminals of the battery cells, and a negative electrode cell tab electrically connected to at least one of negative electrode terminals of the battery cells, the positive electrode cell tab is exposed to the outside of the upper case through a hole formed in the upper case and the negative electrode cell tab is exposed to the outside of the lower case through a hole formed in the lower case.

13. The lead tab of claim 11, wherein the protective circuit tab comprises:
    coupling parts coupled to the protective circuit module;
    extending parts extending from the coupling part and formed between the battery cells and the case; and
    protruding parts extending from the extending parts and exposed to the outside of the case while passing through the case.

14. The lead tab of claim 13, wherein the protective circuit module includes through holes formed at one side thereof, and the coupling parts are coupled to the through holes.

15. The lead tab of claim 11, wherein the protective circuit tab is insert-injected into the inside of the case.

16. The lead tab of claim 11, wherein the connection tab is insert-injected into the outside of the case.

* * * * *